(12) United States Patent
Jordan et al.

(10) Patent No.: US 7,488,160 B2
(45) Date of Patent: Feb. 10, 2009

(54) MOTOR-PUMP UNIT

(75) Inventors: Martin Jordan, Düsseldorf (DE); Guido Liesenfeld, Köln (DE); Tim Lloyd, Warwickshire (GB); Michael Scholand, Wülfrath (DE); Keith Alan Jones, Birmingham (GB); Jochen Gessat, Brühl (DE); Georg Brinkert, Oberhausen (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 11/206,247

(22) Filed: Aug. 17, 2005

(65) Prior Publication Data

US 2006/0039804 A1 Feb. 23, 2006

Related U.S. Application Data

(63) Continuation of application No. PCT/EP2004/001488, filed on Feb. 17, 2004.

(30) Foreign Application Priority Data

Feb. 17, 2003 (DE) .............................. 203 02 534 U

(51) Int. Cl.
*F04B 17/00* (2006.01)
*F04B 35/04* (2006.01)
(52) U.S. Cl. ............... 417/423.14; 417/366; 417/410.4; 417/423.7

(58) Field of Classification Search ................. 417/310, 417/410.4, 366, 440, 423.14, 423.7
See application file for complete search history.

(56) References Cited

U.S. PATENT DOCUMENTS

| | | | | | |
|---|---|---|---|---|---|
| 5,360,322 | A | * | 11/1994 | Henein et al. | ............... 417/313 |
| 5,396,535 | A | * | 3/1995 | Linhart | ........................ 378/197 |
| 5,420,492 | A | * | 5/1995 | Sood et al. | ................... 318/809 |
| 5,810,568 | A | * | 9/1998 | Whitefield et al. | ....... 417/423.8 |
| 5,915,926 | A | * | 6/1999 | Janik et al. | .................. 417/44.2 |
| 6,158,983 | A | * | 12/2000 | Harpole et al. | ............ 417/410.4 |
| 6,283,732 | B1 | * | 9/2001 | Reinartz et al. | ............. 417/440 |
| 2001/0051098 | A1 | | 12/2001 | Kenney et al. | |

FOREIGN PATENT DOCUMENTS

| | | |
|---|---|---|
| DE | 196 27 668 | 1/1998 |
| DE | 198 59 340 | 7/2000 |
| DE | 202 05 936 | 8/2002 |
| EP | 1 004 772 | 5/2000 |
| JP | 04 09 6641 | 3/1992 |

\* cited by examiner

*Primary Examiner*—Devon C Kramer
*Assistant Examiner*—Peter J Bertheaud
(74) *Attorney, Agent, or Firm*—MacMillan, Sobanski & Todd, LLC

(57) ABSTRACT

A motor-pump unit, in particular for a power steering system of a motor vehicle, comprises a housing, a pump, and a drive motor. The pump is constructed as a prefabricated pump module. Both the pump module and the motor are received directly in the housing.

15 Claims, 4 Drawing Sheets

MOTOR-PUMP UNIT

CROSS-REFERENCE TO RELATED APPLICATIONS

This application is a continuation of International Application No. PCT/EP2004/001488 filed Feb. 17, 2004, the disclosures of which are incorporated herein by reference, and which claimed priority to German Patent Application No. 203 02 534.2 filed Feb. 17, 2003, the disclosures of which are incorporated herein by reference.

BACKGROUND OF THE INVENTION

The invention relates to a motor-pump unit, in particular for a power steering system of a motor vehicle, comprising a housing, a pump, and a drive motor.

Such a motor-pump unit, which can also be used in other areas of application, for example in a rolling stabilizing system, is known from German Utility Model No. 202 05 936.7 and comprises an outer housing, a pump housing and a motor housing. In the known unit, the pump housing and the motor housing are arranged inside the outer housing, which also serves as a storage container for the hydraulic fluid which is to be delivered.

The invention provides an extremely compact and favorably priced motor-pump unit, which is distinguished by a simple structure and a simple installation.

BRIEF SUMMARY OF THE INVENTION

According to the invention, in a motor-pump unit of the type initially mentioned, provision is made that the pump is constructed as a prefabricated pump module and that both the pump module and the motor are received directly in the housing. The housing constitutes an integral housing for all the essential components of the motor-pump unit. A separate housing for the motor can be dispensed with. The installation is simplified, because the pump module is a pre-assembled structural unit which is simply inserted into the housing. As the motor-pump unit according to the invention has fewer and simpler interfaces, the tolerance problem is also simplified.

In the preferred embodiments of the invention, the motor is a wet rotor motor, so that it can be fluid-cooled. The motor can be an inside rotor electric motor, which is distinguished by its compactness, or alternatively an outside rotor electric motor.

According to a further development of the invention, a sensorless motor control is provided. The elimination of Hall sensors or the like for closed-loop control of the motor permits a more compact design of the structural space for the motor. During installation of the motor, no tolerances have to be taken into consideration with respect to the position of the motor relative to such sensors.

Preferably, in the housing a motor space is formed which serves as a hydraulic fluid reservoir, from which the pump module sucks hydraulic fluid. The flow which is thereby automatically introduced in the motor space regulates the heat balance of the motor, because the motor heat occurring in operation can be taken up by the hydraulic fluid in an optimum manner and carried away. The emission of thermal energy of the motor to the hydraulic fluid in addition improves the cold start performance of the hydraulic pump. The effective utilization of the motor space as main component of the hydraulic fluid reservoir of the motor-pump unit in addition allows the part of the hydraulic fluid reservoir which is provided for volume equalization to be designed so as to be very compact.

In the housing an electronic unit arranged adjacent to the motor space can be received, which is constructed on a carrier plate, the carrier plate sealing the motor space. Therefore, all the motor, electronic and pump components are held in a single housing. The electronic unit can contain power electronics components, which are arranged on a side facing away from the motor space, or alternatively on a side of the carrier plate facing the motor space. According to the first alternative mentioned, the power electronics components are protected from contact with the hydraulic fluid and are cooled indirectly by the dissipation of heat via the carrier plate to the hydraulic fluid. According to the second alternative mentioned, the power electronics components are cooled directly by the hydraulic fluid.

In the preferred embodiments, a resonator space is provided for the reduction of pulsations, which occur in particular with the use of an outside gear pump. The resonator which is formed in this way can be constructed largely independently of the pump, i.e. the rigidity of the resonator walls can be designed independently of the actual pump function. This promotes an optimum design of the damping behavior.

According to a first embodiment, the resonator space is formed in the housing and is closed by a resonator cover which is constructed as a flat punched part. Such a resonator cover is sturdy and can be produced at a favorable cost. According to a second embodiment, the resonator space is formed substantially by a bell-shaped resonator cover, which is mounted on the housing. Such a cover can be constructed as a diecast or deep-drawn part. Both embodiments are distinguished by the direct or indirect integration of the resonator into the housing, in contrast to conventional motor-pump units, in which a resonator is constructed in the pump or is arranged as a separate component for example on an end face of the pump.

In the resonator cover, preferably a combined pressure control and non-return valve is installed, which brings savings of time and cost compared with an installation of individual valves.

The arrangement of the pump module in the resonator space proves to be particularly space-saving, which leads to an extremely compact structure of the pump with the associated components. This further development of the invention is based on the finding that instead of a separate resonator or a resonator provided in the pump, the reduction of the pressure pulsations generated by the pump can also be achieved by a resonator space filled with hydraulic fluid and surrounding the pump module.

A very effective mounting of the pump module is achieved in that the pump module is mounted in the housing at least in a supporting manner by a differential force on a wall delimiting the motor space, the differential force resulting from surfaces of different size, acted upon with pressure by the hydraulic fluid, on the side of the pump module facing the motor or facing away from the motor. In this way, a coupling to the motor can be achieved without screws which may become loose in the course of time, and without or with simpler damping or equalization elements, a good acoustic disconnection of the pump module from the housing being provided. In addition, the installation costs and the installation effort are reduced.

The installation of the motor-pump unit according to the invention can be further simplified by the motor and preferably also the electronic unit being able to be installed from a first side of the housing and the pump module and preferably also the resonator cover and the container cover from a second side.

The housing is preferably constructed in one piece as a diecast part or formed from diecast and deep-drawn parts.

Other advantages of this invention will become apparent to those skilled in the art from the following detailed description of the preferred embodiment, when read in light of the accompanying drawings.

DETAILED DESCRIPTION OF THE INVENTION

Figure 1:
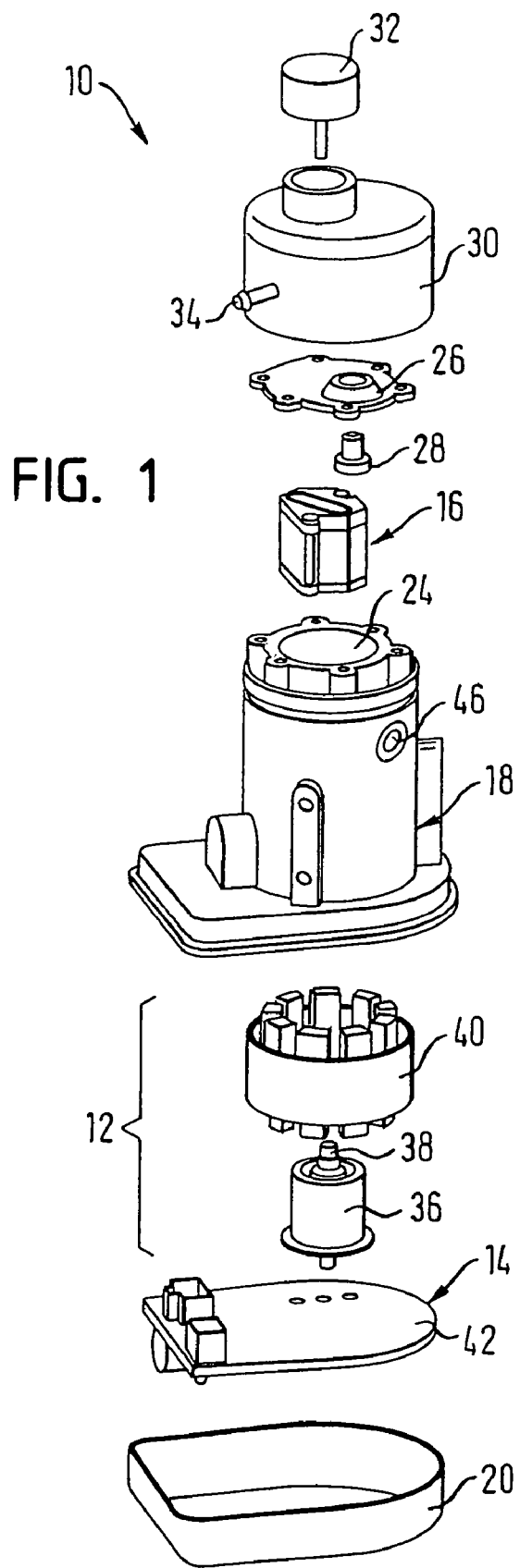
FIG. 1 shows an exploded view of a motor-pump unit according to the invention in accordance with a first embodiment.
Figure 2:
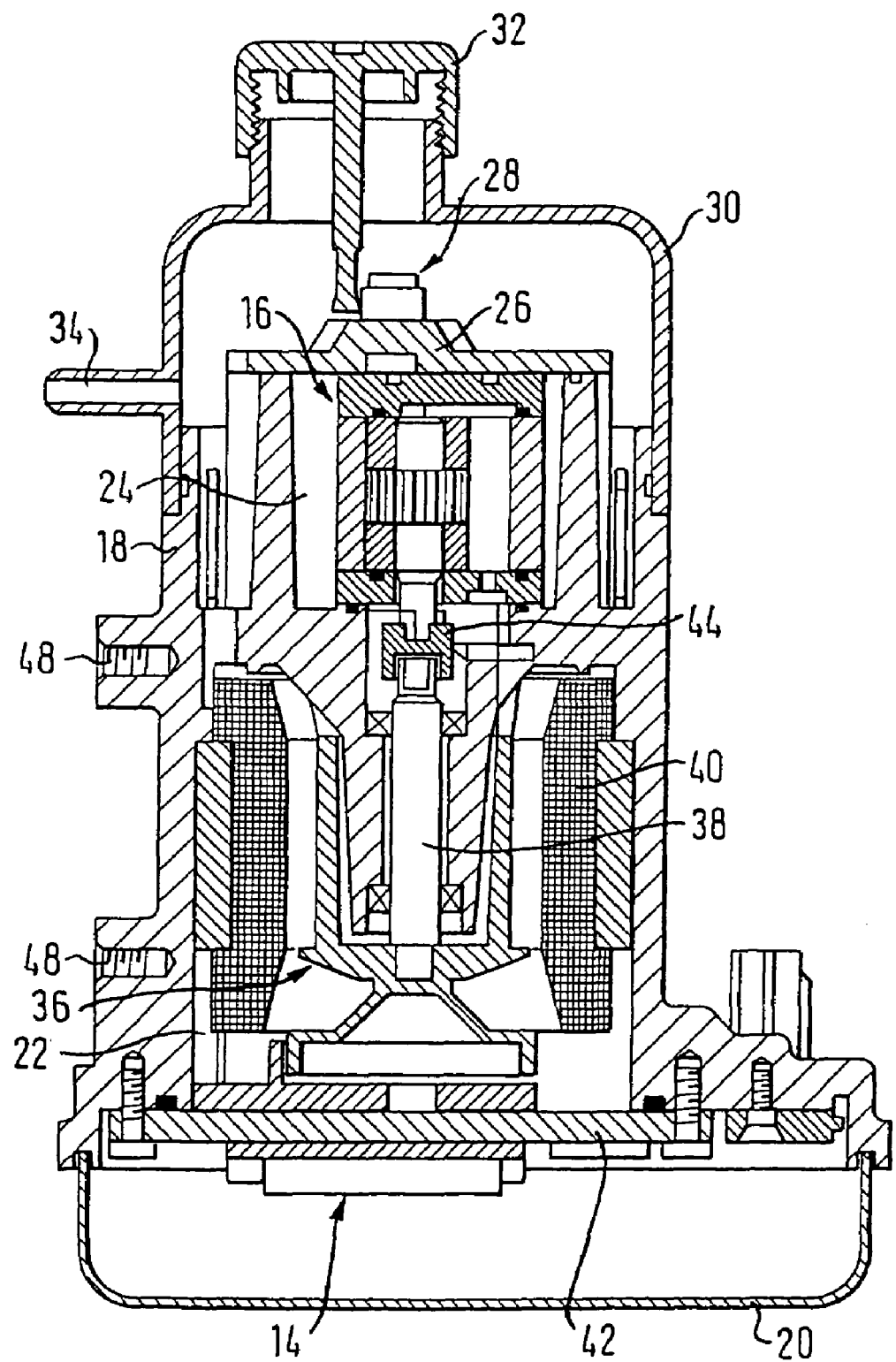
FIG. 2 shows a sectional view of the motor-pump unit of FIG. 1.

In FIGS. 1 and 2, a motor-pump unit 10 is shown, the illustrated orientation of the motor-pump unit 10 corresponding approximately to the later installation position in a motor vehicle. The motor-pump unit 10 comprises a drive motor 12, an electronic unit 14, and a pump module 16. These components of the motor-pump unit 10 are received in a housing 18 which is open on two sides. The lower side of the housing 18 is closed by a housing cover 20. In the housing 18, a motor space 22 (see FIG. 2) and a resonator space 24 are formed, which is closed by a resonator cover 26. In the resonator cover 26, a combined pressure control and non-return valve 28 is mounted. The motor-pump unit 10 additionally comprises a cup-shaped container cover 30 with a cap 32 and a return connection 34. The container cover 30 closes the upper side of the housing 18 and delimits a hydraulic fluid reservoir, the interior of the housing 18 being constructed substantially "open", so that all the components of the motor-pump unit 10 received in the housing 18 are surrounded by hydraulic fluid.

The drive motor 12 of the unit is therefore constructed as a wet rotor motor and is an integral component of the internal fluid circuit. The motor 12 is an inside rotor electric motor, mounted in the housing 18, with a rotor 36, a shaft 38 connected with the rotor 36, and a stator 40 arranged around the rotor 36. The corresponding bearing region of the housing 18 is constructed as a pin which receives two ball bearings and one or two sliding bearings or a hydrodynamic bearing unit. Alternatively to the inside rotor motor, the motor may also be constructed as an outside rotor motor. A sensorless controlling of the motor is provided, i.e. the open- and closed-loop control of the motor takes place without a Hall sensor arrangement.

The electronic unit 14 contains the electronic components necessary for operating and controlling the motor-pump unit 10. The electronic unit 14 constitutes an independent module and is constructed on a carrier plate 42 (e.g. of aluminum). The carrier plate 42 on the one hand constitutes a thermal capacity to receive the heat produced in the electronic components, and on the other hand it serves as a plate for sealing against the motor space 22 and therefore promotes the transfer of heat to the hydraulic fluid. The power electronics components of the electronic unit 14 are arranged on the side of the carrier plate 42 facing away from the motor space 22, so that they are cooled indirectly by the hydraulic fluid through the emission of heat to the carrier plate 42, the side of which facing the motor space 22 is in contact with the hydraulic fluid. Alternatively, the power electronics components can also be arranged on the side facing the motor space 22, so that a direct cooling by the hydraulic fluid takes place.

The compact pump module 16 forms a pre-assembled structural unit and contains all the essential pump components. The pump module 16 is preferably constructed as an outside gear pump, but other types of pump may also be realized. The pump module 16 is placed inside the resonator space 24, which is described in more detail further below, and is coupled to the shaft 38 of the motor by means of a coupling 44. For a correct positioning of the pump module 16, positioning pins are formed integrally with the pump module 16. An actual fastening of the pump module 16 to the wall, delimiting the motor space 22, in the housing 18 is not absolutely necessary, because the pump module 16 in the resonator space 24 filled with hydraulic fluid is pressed against this wall by a differential force on application of pressure after the start-up of the pump module 16. The differential force results from surface areas of different sizes, which are acted upon with pressure, with respect to the side of the pump module 16 facing the motor 12 and the side facing away from the motor 12. Alternatively or in addition, however, a fastening of the pump module 16 can be provided, for example by a screw connection.

The resonator of the motor-pump unit 10 formed by the resonator space 24 serves to reduce the pulsations of the hydraulic fluid caused in particular by an outside gear pump, the resonator being constructed as a largely integral component of the housing 18. The resonator is closed by the resonator cover 26, a largely flat punched metal part. The resonator cover 26 is fastened by screws on the housing 18, but can alternatively also be constructed as a screw cover.

Instead of the combined pressure control and non-return valve 28 mounted in the resonator cover 26, alternatively also two corresponding individual valves can be provided, the valves or the components thereof being able to be mounted at least partially also in the resonator region of the housing 18 or integrated therein.

A main component of the hydraulic fluid reservoir of the motor-pump unit 10 is constituted by the motor space 22, from which the pump sucks hydraulic fluid. The remaining region of the reservoir for volume equalization, principally arranged around the resonator, is of a very compact configuration. However, this region can alternatively also be constructed as a separate equalization tank connected to the motor-pump unit 10 by a hose, or as an equalization connection piece arranged on the motor-pump unit 10.

The housing 18 is preferably constructed as a diecast part or as a combination of diecast and deep-drawn parts. As already mentioned, the housing 18 contains parts of the resonator and of the hydraulic fluid reservoir. In addition, the housing 18 has a pressure outlet and several outer fastening points 48 in the central housing region (in relation to the height of the housing).

The structure of the motor-pump unit 10 is designed such that the motor components and the electronic components can be installed into or onto the housing 18 from one side and the hydraulic components (in particular pump module 16, resonator cover 26, pressure control and non-return valve 28) from the opposite side.

Figure 3:
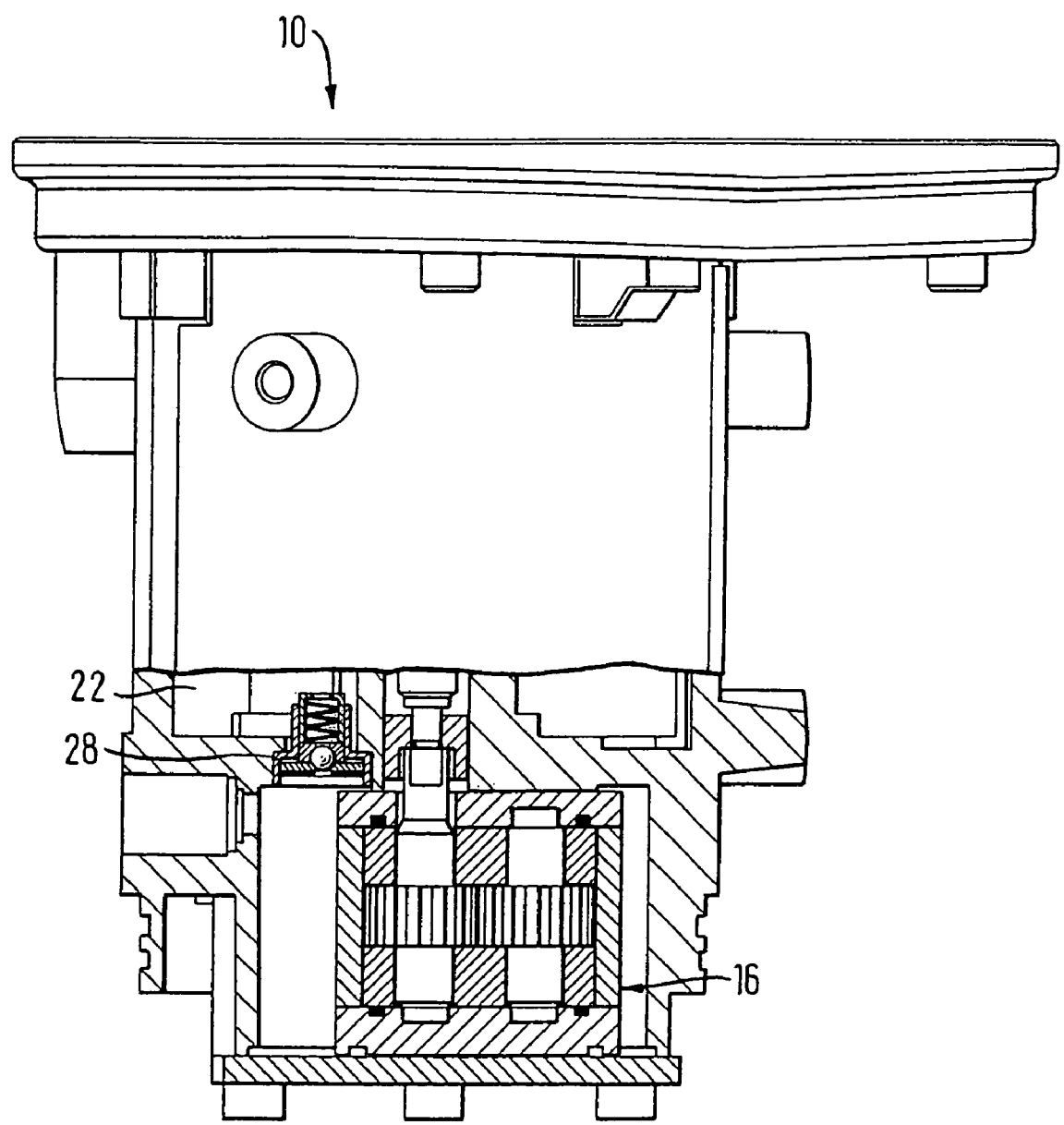
FIG. 3 shows a view, partially in section, of a variant of the motor-pump unit in accordance with the first embodiment.

In FIG. 3 a variant of the motor-pump unit 10 according to the invention is illustrated, in which the installation takes place the other way round, for reasons of structural space. Apart from the reversed orientation, according to which the pump module 16 is arranged under the motor 12, the structure is largely unchanged. The pressure control and non-return valve 28, however, is not held here in the resonator cover 26, but rather is arranged in the housing region between the pump module 16 and the motor 12 such that it discharges into the motor space 22.

Figure 4:
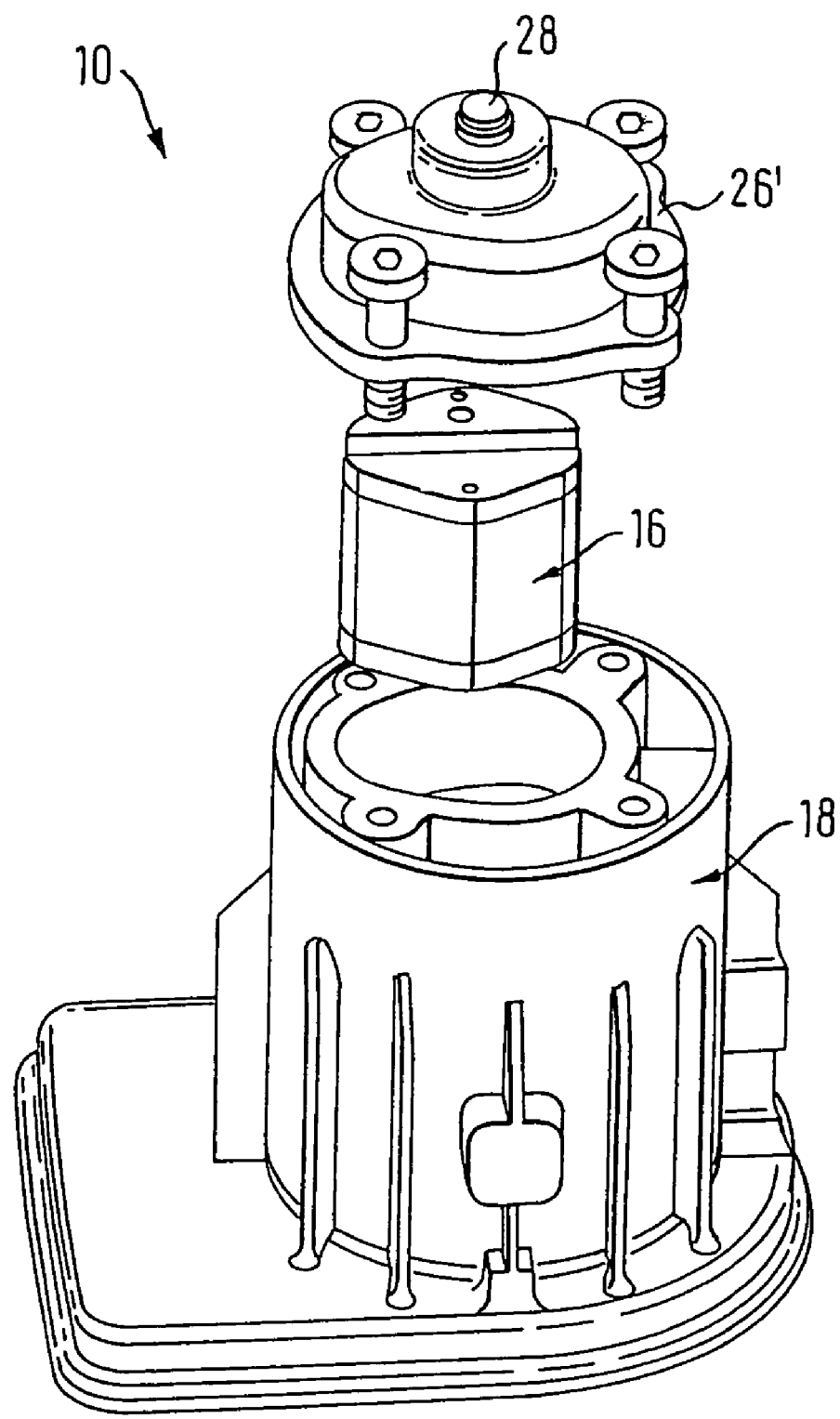
FIG. 4 shows a simplified exploded view of a motor-pump unit according to the invention in accordance with a second embodiment.

In the embodiment of the motor-pump unit 10 shown in FIG. 4, in contrast to the embodiment previously described, the resonator space 24 is defined substantially by a bell-shaped resonator cover 26'. The bell-shaped resonator cover 26' is not constructed here as a flat punched part, but rather as a diecast or deep-drawn part.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A motor-pump unit, comprising:
    a housing including a surrounding side wall and having a first open end and a second open end, the first open end defining a pump space, the second open end defining a motor space which also serves as a hydraulic fluid reservoir, the housing further including an intermediate wall disposed between the pump space and the motor space;
    a pump module disposed in the pump space of the housing, the pump module including a pump body separate from the housing and containing pump components, and a pump cover closing the pump body;
    wherein an outer surface of the pump body and an inner surface of the side wall of the housing cooperate to define a resonator space, the pump module having an inlet sucking hydraulic fluid from the hydraulic fluid reservoir and having an outlet for supplying pressurized fluid to the resonator space;
    a resonator cover separate from the pump cover connected to the first open end of the housing and closing and sealing the resonator space;
    a drive motor received directly in the motor space of the housing and connected through the intermediate wall of the housing to drive the pump module; and
    a plate connected to the second open end of the housing and closing and sealing the motor space.

2. The motor-pump unit according to claim 1, wherein the plate is a carrier plate separate from the housing and has power electronics components arranged on a surface thereof.

3. The motor-pump unit according to claim 1, wherein the resonator cover is constructed as a flat punched part.

4. The motor-pump unit according to claim 1, wherein the resonator space is formed substantially by a bell-shaped resonator cover which is mounted on the housing.

5. The motor-pump unit according to claim 4, wherein the bell-shaped resonator cover is constructed as one of a diecast and a deep-drawn part.

6. The motor-pump unit according to claim 1, wherein the housing is constructed in one piece as a diecast part.

7. The motor-pump unit according to claim 1, wherein the housing is formed from diecast and deep-drawn parts.

8. The motor-pump unit according to claim 1, wherein the drive motor is immersed in the hydraulic fluid in the motor space of the housing.

9. The motor-pump unit according to claim 1, wherein the resonator space is filled with hydraulic fluid which surrounds the pump module.

10. The motor-pump unit according to claim 1, wherein hydraulic fluid pressure within the resonator space urges the pump module toward the intermediate wall of the housing.

11. The motor-pump unit according to claim 1, wherein the resonator space acts to reduce pulsations generated by the pump module, thereby reducing noise.

12. The motor-pump unit according to claim 2, wherein the power electronics components are arranged on a side of the carrier plate facing away from the motor space.

13. The motor-pump unit according to claim 2, wherein heat generated by the power electronics components is transferred through the carrier plate to the hydraulic fluid in the motor space.

14. The motor-pump unit according to claim 1, further including a combined pressure control and non-return valve installed in the resonator cover.

15. The motor-pump unit according to claim 1, further including a hydraulic fluid reservoir arranged around the resonator space, the hydraulic fluid reservoir providing fluid volume equalization.

* * * * *

UNITED STATES PATENT AND TRADEMARK OFFICE
CERTIFICATE OF CORRECTION

| | | |
|---|---|---|
| PATENT NO. | : 7,488,160 B2 | Page 1 of 1 |
| APPLICATION NO. | : 11/206247 | |
| DATED | : February 10, 2009 | |
| INVENTOR(S) | : Martin Jordan et al. | |

It is certified that error appears in the above-identified patent and that said Letters Patent is hereby corrected as shown below:

Column 6, Claim 7, lines 15, delete "fonned" and insert --formed--.

Signed and Sealed this

Twenty-fourth Day of March, 2009

JOHN DOLL
*Acting Director of the United States Patent and Trademark Office*